United States Patent
Gull

[15] 3,637,281
[45] Jan. 25, 1972

[54] OPTICAL SCANNING EQUIPMENT

[72] Inventor: Frank Arthur Gull, 28 Oaklands Lane, Smallford, Hertfordshire, England

[22] Filed: Mar. 27, 1969

[21] Appl. No.: 811,698

[30] Foreign Application Priority Data

Apr. 1, 1968 Great Britain....................5,299/68

[52] U.S. Cl. ........................................... 350/7, 178/7.6
[51] Int. Cl. .................................................. G02b 17/00
[58] Field of Search.................................350/7; 178/7.6

[56] References Cited

UNITED STATES PATENTS 3,019,292 1/1962 John.........................................350/7
3,211,046 10/1965 Kennedy...................................350/7

Primary Examiner—Rodney D. Bennett, Jr.
Assistant Examiner—Brian L. Ribando
Attorney—Dowell & Dowell

[57] ABSTRACT

Aerial photographic-equipment of the line-scanning type in which two parabolic mirrors lie on either side of a square-section rotor with four mirror faces that reflect the scanning beam on to a ridge mirror above the rotor and by which it is directed to an infrared detector cell. The signal from the IR cell is employed to modulate a light beam at one end of the rotor, which modulated beam is reflected out radially from the rotor optical systems within the rotor so as to traverse repeatedly a photographic film which is transported above the rotor in a direction parallel to its axis.

8 Claims, 7 Drawing Figures

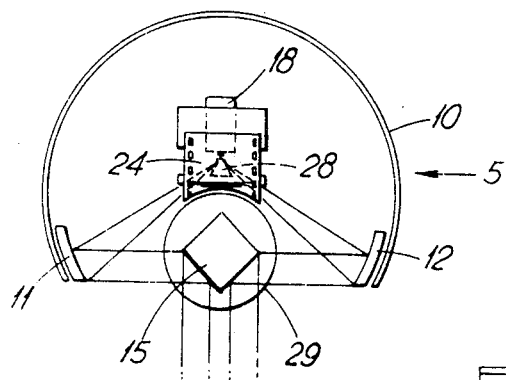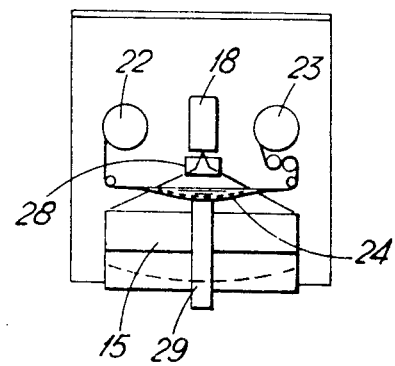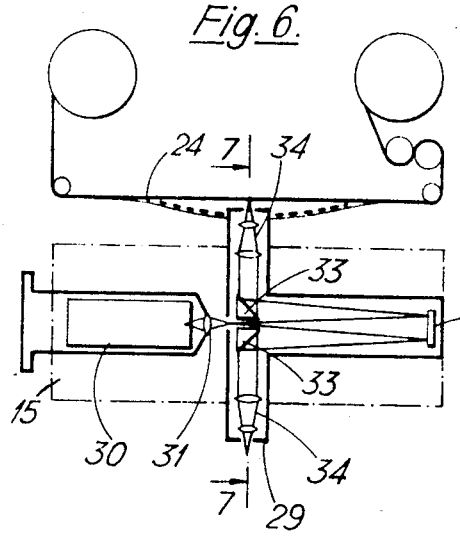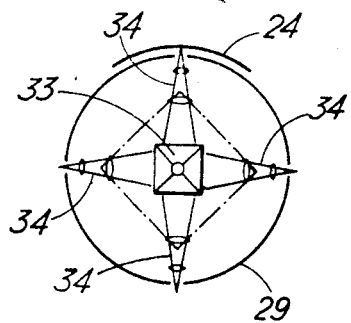

OPTICAL SCANNING EQUIPMENT

This invention relates to scanning equipment for viewing or illuminating a scene over a wide angle, especially in connection with obtaining a photographic record of a terrestrial scene. A primary field of application of the invention lies in photographing the landscape passing beneath an airborne or similar vehicle, particularly to obtain a "thermal" picture of the infrared part of the spectrum.

It is an object of the invention to provide scanning equipment for this type of duty which is unusually compact and uses fewer components than systems available hitherto, and for which the driving power required is kept advantageously low.

According to the present invention line scanning equipment comprises a multifaceted rotor with a reflecting surface on each facet, with two fixed focusing reflectors situated one on either side of the rotor to reflect beams from the faces thereof in convergent paths toward further means arranged to deliver both reflected beams into a common detection device. Preferably, for optical scanning, the rotor is square cross section with four mirror faces. In the infrared case the detection device will normally be an infrared sensitive electrical cell. All the picture information can be detected by a sensitive surface or surfaces of a single cell if the fixed reflectors have mirror faces which are parts of a paraboloid and an optical element such as a ridge mirror is employed to reflect into the detector cell beams approaching it on either side from the two collector mirrors.

The arrangement gives spaces immediately above the scanning rotor (assuming the field of scan is below the scanner) for further equipment in the system. To produce a photographic record in the infrared case the signal output of the detector cell may be employed to modulate a source of white light projected as a focused recording beam for writing on ordinary photographic film. The film transport unit can advantageously be located in the aforesaid space above the scanning rotor.

In the preferred arrangement the same rotor is employed not only to perform the line scan in the viewing optical system but also to provide the line scan for producing the photographic record. To achieve this the film can be arranged to travel above the rotor parallel to and along the rotor axis and the rotor can include a portion housing a rotating optical system for projecting the modulated recording beam radially with respect to the rotor so that it repeatedly traverse the film above widthwise. If the rotating optical system is a multiple arrangement projecting the recording beam along a number, say four, of equiangularly spaced radial paths each radial beam or light pencil will pass in succession across the film so writing successive lines thereon as the film travels. By making the square section portion of the rotor hollow and situating the source of white light, e.g., a glow lamp, within the square section portion at or near one end an exceptionally compact assembly is achieved wherein all the recording optics are carried in or around the rotor.

By way of example, one embodiment of the invention will now be described with reference to the accompanying drawings, which show equipment to be housed in an airborne vehicle, i.e., a drone, for taking an infrared photographic record of the terrain below. In the drawings:

FIG. 4 is a diagram of a film recorder seen in the same direction as that in FIG. 2, FIG. 5 shows the film recorder in the direction of the arrow 5 of FIG. 4, FIG. 6 is a diagram of the recorder optics seen from the same viewpoint as that in FIG. 5, and FIG. 7 shows the recorder optics on the line 7—7 of FIG. 6.

Figure 1:
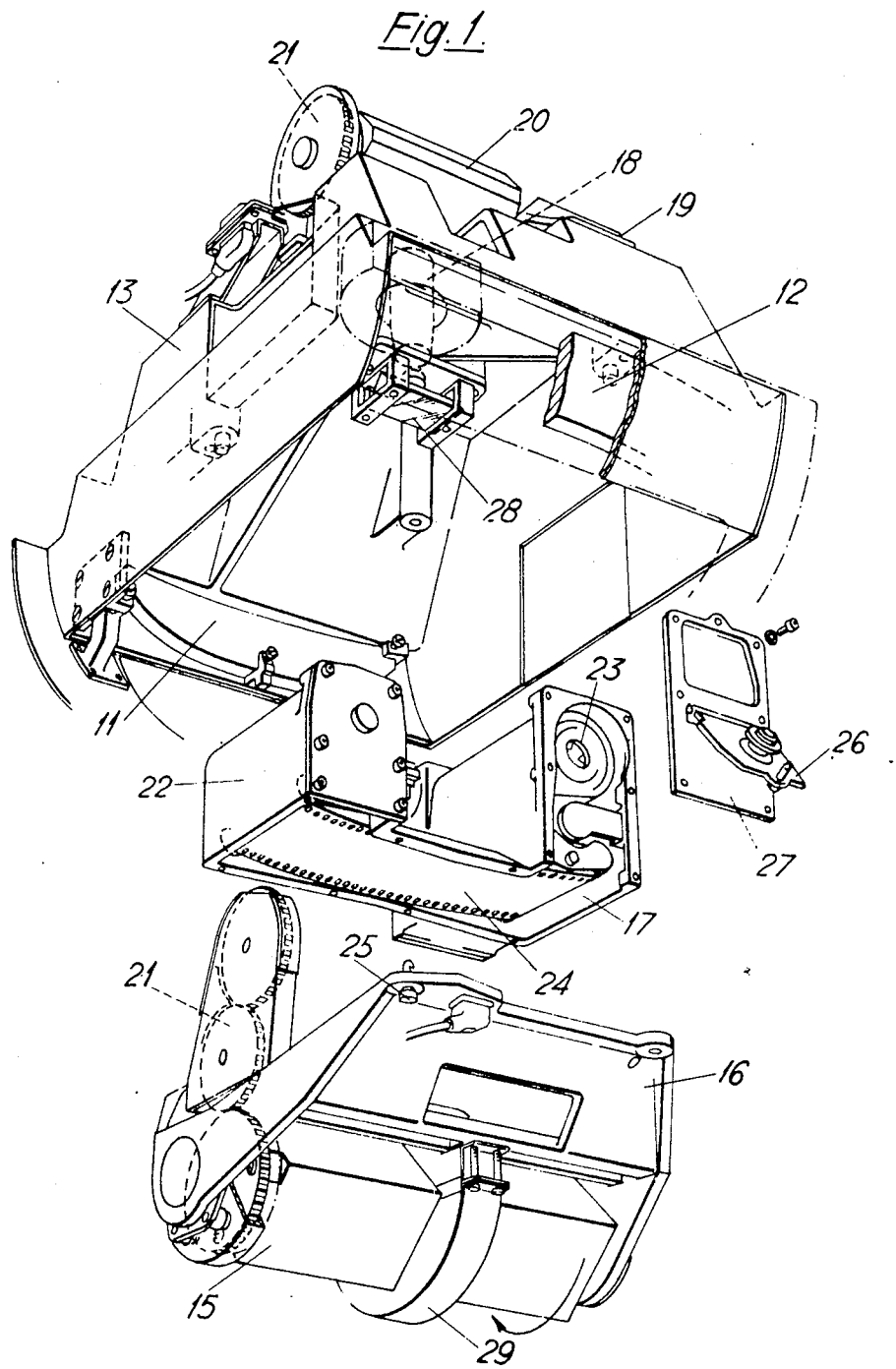
FIG. 1 is an exploded pictorial view of the equipment.
Figure 2:
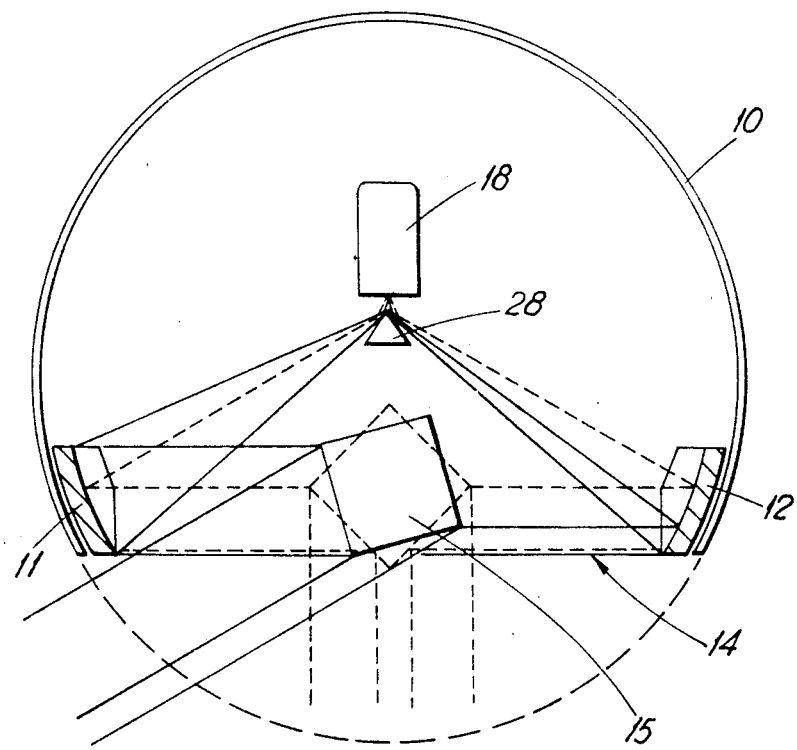
FIG. 2 is a diagram of the scanning optics seen along the axis of the rotor.
Figure 3:
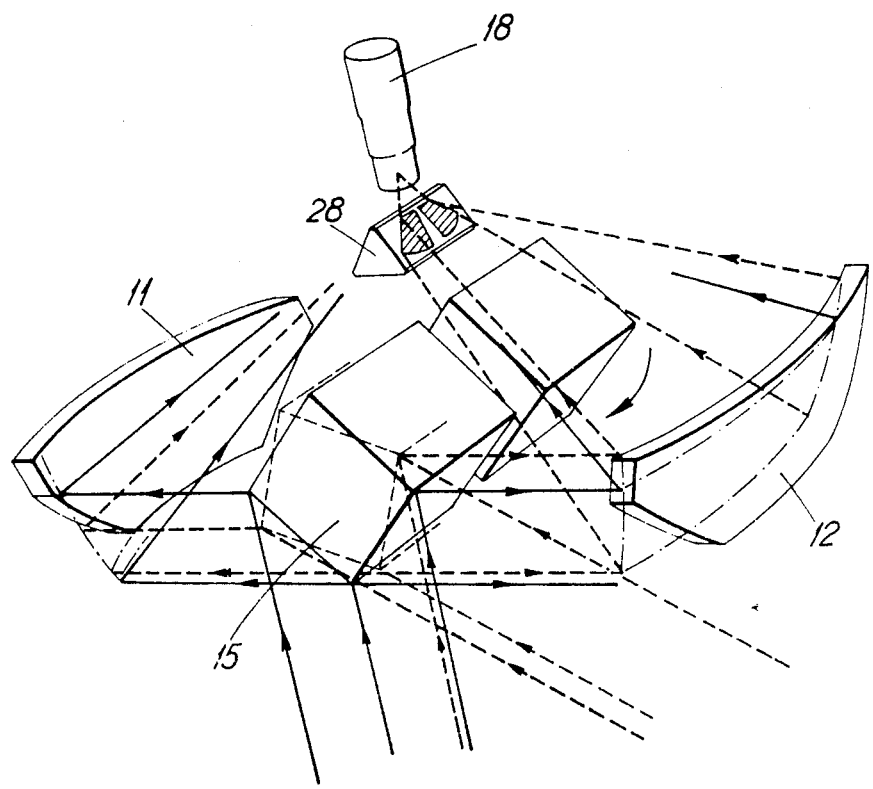
FIG. 3 is a pictorial diagram illustrating the operation of the scanning optics.

The equipment is designed as a self-contained unit to fit into a drone camera compartment 10 which takes the form generally of a horizontal cylinder. The line scan device consists of a main frame 13 of light alloy supporting two split paraboloid collector mirrors 11, 12 disposed at either side of an aperture 14 cut into the lower half of the drone skin and structure. Between the two mirrors 11, 12 spins an optically polished square scanner 15, rotating at 7,500 rev./min. about a horizontal fore and aft axis to scan the field of view across the terrain beneath the drone through the aperture 14.

Immediately above and attached to the scanner mounting 16 is a film transport holder 17 and film drive mechanism. Above this, centrally mounted on top of the main frame 13 is the infrared detector 18, electronics pack 19, and a DC motor 20 that drives the scanner rotor through a train of gears 21 at the forward end of the structure. The film transport comprises a supply compartment 22 for an unused film cassette at the front end and a compartment 23 for an exposed film cassette at the rear, the film 24 (70mm.) travelling substantially horizontally from front to rear between the two. Quick access to the used film cassette is obtained by removing the scanner mounting 16 and film transport holder 17 in one piece, by loosening four quick-release bolts 25, leaving the remainder of the line scan in situ, and opening a hatch 26 in an end plate 27 of the compartment 23.

The choice of the four-sided mirror results from the fact that this configuration gives a reasonably optimum collecting area, consistent with a modest power to drive the rotor and furthermore enables a reasonably constant aperture to be presented during the effective scan.

From this arrangement, the largest collecting aperture can be obtained for the drone space and power available. Since power absorbed in windage losses is approximately proportional to the fifth power of the rotor diameter and directly proportional to length it is important to obtain the desired aperture area using a rotor which can be long and have a small diameter, rather than vice versa. The scanner should therefore be designed, firstly, to occupy the maximum length of aperture available in the drone skin and then to have the largest possible diameter within the limit set by the power available to drive it. A system with a square mirror can operate at atmospheric pressure, without the need for a sealed window to enable a lower pressure to be used to reduce windage.

The fixed optical components collect the radiation reflected from the scanning rotor and focus it on to the infrared detector. These surfaces are all reflecting to avoid transmission losses which would occur if lenses were used. The split paraboloid collector mirrors 11, 12 are used to gather radiation from each side of the rotor 15 and to focus it on to the detector 18 via a small reflecting ridge mirror 28. The split collectors allow the optical system to have minimum height, and provide space between and above them for the photographic recording equipment.

The paraboloid surfaces of the collector mirrors give a resolution better than one milliradian about the scanner axis. These mirrors can be made in glass from a single paraboloid and coated with a gold-reflecting surface and silicon monoxide to provide excellent reflecting properties out to 14 microns wavelength. Such surfaces will not be susceptible to deterioration with time and a salt laden atmosphere, and can be cleaned by hand without fear of damage. Instead of glass, a suitable compression moulded plastic, or a thin plastic coating on an aluminum or honeycomb rigid substrate, may be employed giving savings in production cost and in weight of the system.

The optical system is autocollimating with the scanner rotor removed so that it can be simply focused without the need for an external collimated light source.

The varying signal produced by the infrared detector 18, due to the incoming radiation falling thereon, is used through the medium of a converter unit to modulate white light which then writes upon the photographic film. For this purpose, the square scanner rotor 15 is hollow with an enlargement midway along its length constituting a housing 29 for recorder optics. Into one end of the hollow rotor there projects a stationary flow tube 30 the light output of which is modulated in accordance with the signal output of the infrared detector 18. This light is focused into a beam by a lens 31 and passes axially through the rotor to be reflected back at the far end by a mirror 32.

The rotating housing 29 contains a central assembly of mirrors or prisms 33 that reflect the return beam from the mirror 32 out radially along four paths spaced at 90° angles. In each of these radial paths there is a lens system 34 for focusing the respective beam on to the film 24 above the scanner rotor. The four beams so focused traverse the width of the film in succession as the scanner rotates and thereby "write" four successive lines of the film record. To maintain correct focus, the film is constrained by a curved guide so that, in the region of its travel where the lines of the record are written on it, it is curved widthwise about the axis of the scanner rotor. The speed of the scanner rotor is constant while the film transport speed can be varied to suit the speed of the vehicle.

The whole of the detecting and recording assembly thus forms a particularly compact assembly.

What is claimed is:

1. A scanning and recording system to be carried by a vehicle, comprising a scanning rotor mounted to rotate about an axis parallel to the direction of motion of said vehicle and having a plurality of equiangularly disposed reflecting faces each said face lying in a plane parallel to said axis of rotation, twin fixed focusing reflectors situated one on either side of said rotor to reflect beams from the faces thereof upward in two mutually converging paths, a detection device giving a signal output that varies in accordance with beam strength falling thereon which detection device is mounted above and spaced from said rotor, means receiving said two mutually converging reflected beams and delivering them as a combined beam onto said detection device, record medium transport means, a record medium band transported by said transport means along a path extending above said rotor parallel to said axis of rotation and passing between said rotor and said detection device, recording beam projection means mounted on said rotor to rotate therewith and projecting a recording beam radially with respect to said axis of rotation which recording beam passes repeatedly widthwise across said record medium band transported above said rotor as said rotor rotates, and means modulating said recording beam in accordance with variations in the signal output of said detection device.

2. A system according to claim 1, wherein the scanning is optical scanning and the detection device is an infrared sensitive cell.

3. A system according to claim 2, wherein said fixed focusing reflectors are mirrors with their reflecting faces forming parts of a paraboloid, and said means receiving said two mutually converging beams is a ridge mirror oriented to reflect onto said detection device beams approaching it on either side from said two fixed paraboloid mirrors.

4. A system according to claim 1, wherein said rotor is generally of square cross section with four equiangularly disposed mirror faces.

5. A system according to claim 1, wherein said recording beam projection means comprises multiple optical focusing systems projecting said recording beam along a plurality of equiangularly spaced radial paths, whereby plural radial beams pass in succession across said record medium band so recording successive lines thereon as said record medium band travels.

6. A system according to claim 5, wherein said rotor is generally hollow, a light source modulated in accordance with said detector device signal output disposed at one end of said rotor, and said recording beam projection beams further comprises central reflecting optical means within said rotor, the light from said light source passing axially within the rotor and being reflected to said multiple optical systems by said central reflecting optical means.

7. A system according to claim 1, disposed in and aerial vehicle for scanning the terrestrial scene below and operating at ambient atmospheric pressure.

8. A system according to claim 1, wherein said record medium band is a photographic film, and a curved guide constrains said film, in the region of its travel where it is scanned by said recording beam, to a widthwise curvature centered on said axis of rotation.

* * * * *